(12) United States Patent
Turgeon

(10) Patent No.: US 11,922,427 B2
(45) Date of Patent: Mar. 5, 2024

(54) SYSTEM AND METHOD FOR PROCESSING CARD NOT PRESENT TRANSACTIONS

(71) Applicant: Visa International Service Association, San Francisco, CA (US)

(72) Inventor: Paul Charles Turgeon, Fort Collins, CO (US)

(73) Assignee: Visa International Service Association, San Francisco, CA (US)

( * ) Notice: Subject to any disclaimer, the term of this patent is extended or adjusted under 35 U.S.C. 154(b) by 435 days.

(21) Appl. No.: 17/048,178

(22) PCT Filed: Apr. 17, 2018

(86) PCT No.: PCT/US2018/027858
§ 371 (c)(1),
(2) Date: Oct. 16, 2020

(87) PCT Pub. No.: WO2019/203798
PCT Pub. Date: Oct. 24, 2019

(65) Prior Publication Data
US 2021/0103932 A1    Apr. 8, 2021

(51) Int. Cl.
*G06Q 20/40* (2012.01)
*G06Q 20/42* (2012.01)

(52) U.S. Cl.
CPC ..... *G06Q 20/4093* (2013.01); *G06Q 20/4015* (2020.05); *G06Q 20/4016* (2013.01); *G06Q 20/42* (2013.01)

(58) Field of Classification Search
CPC .......... G06Q 20/4093; G06Q 20/4015; G06Q 20/4016; G06Q 20/42; G06Q 20/405; G06Q 20/409; G06Q 20/352; G06Q 30/06; G06Q 20/20; H04L 2463/102; H04W 12/08
USPC ........................................................ 705/75
See application file for complete search history.

(56) References Cited

U.S. PATENT DOCUMENTS

| | | | |
|---|---|---|---|
| 5,870,723 A | * | 2/1999 | Pare, Jr. ............... G06Q 20/341 705/39 |
| 6,397,198 B1 | * | 5/2002 | Hoffman ............ G06Q 20/3674 705/64 |
| 7,584,153 B2 | | 9/2009 | Brown et al. |
| 9,681,305 B2 | | 6/2017 | Colegate et al. |
| 2007/0136211 A1 | | 6/2007 | Brown et al. |
| 2010/0312703 A1 | | 12/2010 | Kulpati et al. |

(Continued)

FOREIGN PATENT DOCUMENTS

| | | |
|---|---|---|
| CN | 105408927 A | 3/2016 |
| CN | 107787502 A | 3/2018 |

(Continued)

*Primary Examiner* — Zeshan Qayyum
(74) *Attorney, Agent, or Firm* — The Webb Law Firm

(57) ABSTRACT

A method for processing card not present (CNP) transactions includes: receiving an authentication transaction request including authentication transaction data associated with a CNP transaction, receiving an authorization transaction request including authorization transaction data associated with the CNP transaction; in response to receiving the authorization transaction data and the authentication transaction data, determining an authorization decision for the CNP transaction; and communicating the authorization decision. Systems for processing CNP transactions are also disclosed.

20 Claims, 6 Drawing Sheets

(56) References Cited

U.S. PATENT DOCUMENTS

| | | | |
|---|---|---|---|
| 2011/0022484 A1* | 1/2011 | Smith | G06Q 20/12 |
| | | | 705/17 |
| 2012/0018506 A1* | 1/2012 | Hammad | G06Q 20/385 |
| | | | 235/375 |
| 2012/0066080 A1 | 3/2012 | Erikson | |
| 2013/0173463 A1 | 7/2013 | Stewart et al. | |
| 2014/0188697 A1 | 7/2014 | Bruesewitz et al. | |
| 2016/0080944 A1 | 3/2016 | Colegate et al. | |
| 2017/0308900 A1* | 10/2017 | Kohli | G06Q 20/4016 |

FOREIGN PATENT DOCUMENTS

| | | | |
|---|---|---|---|
| JP | 2007334521 A | 12/2007 | |
| JP | 2008165824 A | 7/2008 | |
| JP | 2009043087 A | 2/2009 | |
| JP | 2012215918 A | 11/2012 | |
| JP | 2015176233 A | 10/2015 | |
| KR | 101123045 B1 | 3/2012 | |
| KR | 101653805 B1 | 9/2016 | |

* cited by examiner

SYSTEM AND METHOD FOR PROCESSING CARD NOT PRESENT TRANSACTIONS

CROSS-REFERENCE TO RELATED APPLICATION

This application is the United States national phase of International Application No. PCT/US2018/027858 filed Apr. 17, 2018, the disclosure of which is hereby incorporated by reference in its entirety.

BACKGROUND

Technical Field

This disclosure relates generally to transaction systems, and in particular to a system and method for processing card not present transactions.

Technical Description

A "card present" transaction is a secure payment transaction in which a payment transaction is initiated with a portable financial device where the cardholder physically presents the portable financial device for a merchant's visual examination at the time the payment transaction is initiated with the portable financial device. For example, a card present transaction may require a credit card with a security chip or a contactless payment device to be present at the merchant point-of-sale (POS). Accordingly, brick-and-mortar retail stores with physical POS systems are able to conduct card present transactions.

In contrast to a "card present" transaction, a "card not present" (CNP) transaction is a payment transaction in which the cardholder does not physically present the portable financial device for the merchant's visual examination at the time the payment transaction is initiated with the portable financial device. Card present transactions have higher authorization rates and lower fraud rates compared to a CNP transaction because both the card and the cardholder are known to be at the POS and conditions of the POS are known to the authorization system. CNP transactions may be conducted to complete mail-order transactions or transactions initiated over the telephone or the Internet, for example.

Using existing systems and methods for processing payment transactions, a CNP transaction is less secure and more prone to fraud than a card present transaction. This is due, in part, to issues with authenticating the identity of the individual initiating the payment transaction using a portable financial device as the individual to whom the issuer has issued the portable financial device. This is also due, in part, to issues of authenticating the portable financial device and/or the user device associated with the cardholder.

SUMMARY

Accordingly, and generally, provided is an improved system and method for processing card not present transactions.

According to some non-limiting embodiments or aspects, a method for processing card not present (CNP) transactions, includes: receiving, with at least one processor, an authentication transaction request including authentication transaction data associated with a CNP transaction between a user and a merchant initiated with a user device of the user, where the authentication transaction data includes device identification data associated with the user device; receiving, with at least one processor, an authorization transaction request including authorization transaction data associated with the CNP transaction; in response to receiving the authorization transaction data and the authentication transaction data, determining, with at least one processor, an authorization decision for the CNP transaction based at least partially on the authorization transaction data and the authentication transaction data; and in response to the authorization transaction request, generating and communicating, with at least one processor, an authorization transaction response including the authorization decision.

In some non-limiting embodiments or aspects, the authentication transaction data may include velocity data associated with an account identifier of a portable financial device entered into the user device to initiate the CNP transaction, the velocity data including at least one of the following: number of transactions by a specified account identifier using the user device in a specified time period, amount of transactions by a specified account identifier using the user device in a specified time period, or any combination thereof. The authentication transaction data may include velocity data associated with an account identifier of a portable financial device entered into the user device to initiate the CNP transaction, the velocity data including at least one of the following: number of transactions by a specified account identifier at an IP address in a specified time period, amount of transactions by a specified account identifier at the IP address in a specified time period, or any combination thereof. The device identification data may include device browser data, where the device browser data includes at least one of the following: a browser accept header, data indicating whether the browser is Java-enabled, browser language, browser color depth, browser screen depth, browser screen height, browser screen width, browser time zone, browser user agent, or any combination thereof.

In some non-limiting embodiments or aspects, the device identification data may include a device identifier, where the device identifier includes at least one of the following: a unique device ID, a device type, or any combination thereof. The authentication transaction data may include an IP address. The authentication transaction data may include geolocation data associated with a location of the user device. Receiving the authentication transaction data may include receiving a transaction risk score from an authentication system, and the method may further include determining the authorization decision based at least partially on the transaction risk score. The method may further include, in response to receiving the authentication transaction data including the device identification data, determining a transaction risk score; and determining the authorization decision based at least partially on the transaction risk score.

According to some non-limiting embodiments or aspects, provided is a system for processing card not present (CNP) transactions including at least one processor programmed or configured to: receive an authentication transaction request including authentication transaction data associated with a CNP transaction between a user and a merchant initiated with a user device of the user, where the authentication transaction data includes device identification data associated with the user device; receive an authorization transaction request including authorization transaction data associated with the CNP transaction; in response to receiving the authorization transaction data and the authentication transaction data, determine an authorization decision for the CNP transaction based at least partially on the authorization transaction data and the authentication transaction data; and in response to the authorization transaction request, generate and communicate an authorization transaction response including the authorization decision.

In some non-limiting embodiments or aspects, the authentication transaction data may include velocity data associated with an account identifier of a portable financial device entered into the user device to initiate the CNP transaction, the velocity data including at least one of the following: number of transactions by a specified account identifier using the user device in a specified time period, amount of transactions by a specified account identifier using the user device in a specified time period, or any combination thereof. The authentication transaction data may include velocity data associated with an account identifier of a portable financial device entered into the user device to initiate the CNP transaction, the velocity data including at least one of the following: number of transactions by a specified account identifier at an IP address in a specified time period, amount of transactions by a specified account identifier at the IP address in a specified time period, or any combination thereof. The device identification data may include device browser data, where the device browser data comprises at least one of the following: a browser accept header, data indicating whether the browser is Java-enabled, browser language, browser color depth, browser screen depth, browser screen height, browser screen width, browser time zone, browser user agent, or any combination thereof.

In some non-limiting embodiments or aspects, the device identification data may include a device identifier, where the device identifier includes at least one of the following: a unique device ID, a device type, or any combination thereof. The authentication transaction data may include an IP address. The authentication transaction data may include geolocation data associated with a location of the user device. The authentication transaction data may include a transaction risk score from an authentication system, where the authorization decision is based at least partially on the transaction risk score. The system may be further programmed or configured to: in response to receiving the authentication transaction data including the device identification data, determine a transaction risk score; and determine the authorization decision based at least partially on the transaction risk score.

According to some non-limiting embodiments or aspects, provided is a system for processing card not present (CNP) transactions including: an authentication system including at least one processor programmed or configured to: receive authentication transaction data associated with a CNP transaction between a user and a merchant initiated with a user device of the user, where the authentication transaction data includes device identification data associated with the user device; communicate the authentication transaction data via an authentication transaction request to an authorization system programmed or configured to determine an authorization decision associated with the CNP transaction, where the authorization system includes at least one processor programmed or configured to: receive an authorization transaction request including authorization transaction data associated with the CNP transaction; in response to receiving the authorization transaction data and the authentication transaction data, determine an authorization decision for the CNP transaction based at least partially on the authorization transaction data and the authentication transaction data; and in response to the authorization transaction request, generate and communicate an authorization transaction response including the authorization decision.

In some non-limiting embodiments or aspects, the at least one authentication system processor may be further programmed or configured to determine a transaction risk score and communicate the transaction risk score to the authorization system as part of the authentication transaction data. The at least one authorization system processor may be further programmed or configured to: in response to receiving the authentication transaction data, determine a transaction risk score; and determine the authorization decision based at least partially on the transaction risk score.

Further non-limiting embodiments or aspects are set forth in the following numbered clauses:

Clause 1: A method for processing card not present (CNP) transactions, comprising: receiving, with at least one processor, an authentication transaction request comprising authentication transaction data associated with a CNP transaction between a user and a merchant initiated with a user device of the user, wherein the authentication transaction data comprises device identification data associated with the user device; receiving, with at least one processor, an authorization transaction request comprising authorization transaction data associated with the CNP transaction; in response to receiving the authorization transaction data and the authentication transaction data, determining, with at least one processor, an authorization decision for the CNP transaction based at least partially on the authorization transaction data and the authentication transaction data; and in response to the authorization transaction request, generating and communicating, with at least one processor, an authorization transaction response comprising the authorization decision.

Clause 2: The method of clause 1, wherein the authentication transaction data comprises velocity data associated with an account identifier of a portable financial device entered into the user device to initiate the CNP transaction, the velocity data comprising at least one of the following: number of transactions by a specified account identifier using the user device in a specified time period, amount of transactions by a specified account identifier using the user device in a specified time period, or any combination thereof.

Clause 3: The method of clause 1 or 2, wherein the authentication transaction data comprises velocity data associated with an account identifier of a portable financial device entered into the user device to initiate the CNP transaction, the velocity data comprising at least one of the following: number of transactions by a specified account identifier at an IP address in a specified time period, amount of transactions by a specified account identifier at the IP address in a specified time period, or any combination thereof.

Clause 4: The method of any of clauses 1-3, wherein the device identification data comprises device browser data, wherein the device browser data comprises at least one of the following: a browser accept header, data indicating whether the browser is Java-enabled, browser language, browser color depth, browser screen depth, browser screen height, browser screen width, browser time zone, browser user agent, or any combination thereof.

Clause 5: The method of any of clauses 1-4, wherein the device identification data comprises a device identifier, wherein the device identifier comprises at least one of the following: a unique device ID, a device type, or any combination thereof.

Clause 6: The method of any of clauses 1-5, wherein the authentication transaction data comprises an IP address.

Clause 7: The method of any of clauses 1-6, wherein the authentication transaction data comprises geolocation data associated with a location of the user device.

Clause 8: The method of any of clauses 1-7, wherein receiving the authentication transaction data comprises receiving a transaction risk score from an authentication system, wherein the method further comprises determining the authorization decision based at least partially on the transaction risk score.

Clause 9: The method of any of clauses 1-8, further comprising: in response to receiving the authentication transaction data comprising the device identification data, determining a transaction risk score; and determining the authorization decision based at least partially on the transaction risk score.

Clause 10: A system for processing card not present (CNP) transactions comprising at least one processor programmed or configured to: receive an authentication transaction request comprising authentication transaction data associated with a CNP transaction between a user and a merchant initiated with a user device of the user, wherein the authentication transaction data comprises device identification data associated with the user device; receive an authorization transaction request comprising authorization transaction data associated with the CNP transaction; in response to receiving the authorization transaction data and the authentication transaction data, determine an authorization decision for the CNP transaction based at least partially on the authorization transaction data and the authentication transaction data; and in response to the authorization transaction request, generate and communicate an authorization transaction response comprising the authorization decision.

Clause 11: The system of clause 10, wherein the authentication transaction data comprises velocity data associated with an account identifier of a portable financial device entered into the user device to initiate the CNP transaction, the velocity data comprising at least one of the following: number of transactions by a specified account identifier using the user device in a specified time period, amount of transactions by a specified account identifier using the user device in a specified time period, or any combination thereof.

Clause 12: The system of clause 10 or 11, wherein the authentication transaction data comprises velocity data associated with an account identifier of a portable financial device entered into the user device to initiate the CNP transaction, the velocity data comprising at least one of the following: number of transactions by a specified account identifier at an IP address in a specified time period, amount of transactions by a specified account identifier at the IP address in a specified time period, or any combination thereof.

Clause 13: The system of any of clauses 10-12, wherein the device identification data comprises device browser data, wherein the device browser data comprises at least one of the following: a browser accept header, data indicating whether the browser is Java-enabled, browser language, browser color depth, browser screen depth, browser screen height, browser screen width, browser time zone, browser user agent, or any combination thereof.

Clause 14: The system of any of clauses 10-13, wherein the device identification data comprises a device identifier, wherein the device identifier comprises at least one of the following: a unique device ID, a device type, or any combination thereof.

Clause 15: The system of any of clauses 10-14, wherein the authentication transaction data comprises an IP address.

Clause 16: The system of any of clauses 10-15, wherein the authentication transaction data comprises geolocation data associated with a location of the user device.

Clause 17: The system of any of clauses 10-16, wherein the authentication transaction data comprises a transaction risk score from an authentication system, wherein the authorization decision is based at least partially on the transaction risk score.

Clause 18: The system of any of clauses 10-17, wherein the at least one processor is further programmed or configured to: in response to receiving the authentication transaction data comprising the device identification data, determine a transaction risk score; and determine the authorization decision based at least partially on the transaction risk score.

Clause 19: A system for processing card not present (CNP) transactions comprising: an authentication system comprising at least one processor programmed or configured to: receive authentication transaction data associated with a CNP transaction between a user and a merchant initiated with a user device of the user, wherein the authentication transaction data comprises device identification data associated with the user device; communicate the authentication transaction data via an authentication transaction request to an authorization system programmed or configured to determine an authorization decision associated with the CNP transaction, wherein the authorization system comprises at least one processor programmed or configured to: receive an authorization transaction request comprising authorization transaction data associated with the CNP transaction; in response to receiving the authorization transaction data and the authentication transaction data, determine an authorization decision for the CNP transaction based at least partially on the authorization transaction data and the authentication transaction data; and in response to the authorization transaction request, generate and communicate an authorization transaction response comprising the authorization decision.

Clause 20: The system of clause 19, wherein the at least one authentication system processor is further programmed or configured to determine a transaction risk score and communicate the transaction risk score to the authorization system as part of the authentication transaction data.

Clause 21: The system of clause 19 or 20, wherein the at least one authorization system processor is further programmed or configured to: in response to receiving the authentication transaction data, determine a transaction risk score; and determine the authorization decision based at least partially on the transaction risk score.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which.

DETAILED DESCRIPTION

Figure 1:
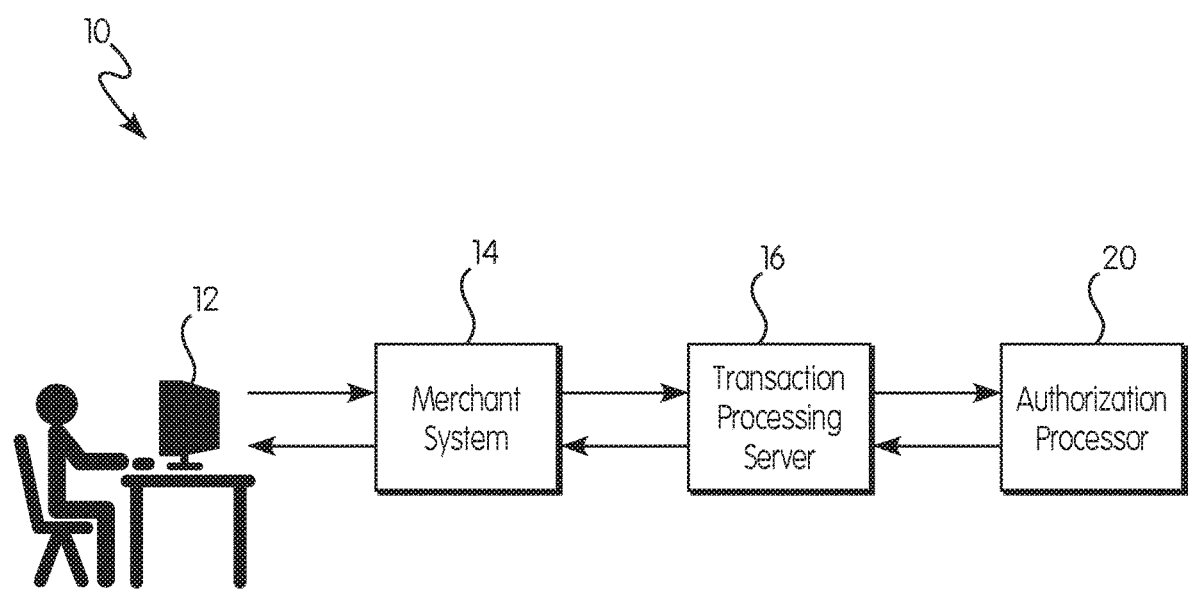
FIG. 1 is a schematic view of an existing system for processing card not present transactions.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the terms "issuing institution," "portable financial device issuer," "issuer," or "issuer bank" may refer to one or more entities that provide accounts to customers for conducting payment transactions, such as initiating credit and/or debit payments. For example, an issuing institution may provide an account identifier, such as a personal account number (PAN), to a customer that uniquely identifies one or more accounts associated with that customer. The account identifier may be embodied on a portable financial device, such as a physical financial instrument, e.g., a payment card, and/or may be electronic and used for electronic payments. As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases, such that they may be used to conduct a transaction without directly using the original account identifier. In some examples, an original account identifier, such as a PAN, may be associated with a plurality of tokens for different individuals or purposes. An issuing institution may be associated with a bank identification number (BIN) that uniquely identifies it. The terms "issuer" and "issuer server" may also refer to one or more computer systems operated by or on behalf of an issuing institution, such as a server computer executing one or more software applications. For example, an issuer system may include one or more authorization servers for authorizing or effecting a payment transaction.

As used herein, the term "merchant" refers to an individual or entity that provides goods and/or services, or access to goods and/or services, to customers (also referred to herein as a "consumer") based on a transaction, such as a payment transaction. "Merchant" or "merchant server" may also refer to one or more computer systems operated by or on behalf of a merchant, such as a server computer executing one or more software applications. As used herein, a "merchant system" may refer to one or more computers and/or peripheral devices used by a merchant to engage in or facilitate payment transactions with customers, including one or more point-of-sale (POS) devices, one or more card readers, near-field communication (NFC) receivers, RFID receivers, and/or other contactless transceivers or receivers, contact-based receivers, payment terminals, computers, servers, input devices, and/or other like devices that may be used to initiate, facilitate, or process a payment transaction. A merchant system may also include one or more server computers programmed and/or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer. The term "transaction service provider" may also refer to one or more computer systems operated by or on behalf of a transaction service provider, such as a server computer executing one or more software applications ("transaction processing server", e.g., VisaNet). The term "transaction processing server" (or system), may include one or more computers, processors, storage devices, network interfaces, and executable instructions or code in the form of applications, APIs, software, firmware, code modules and the like operating in a network environment. When a user engages or initiates a transaction with a merchant at a point-of-sale, he or she will interact with a point-of-sale system, e.g., using a credit card, portable financial device, payment device, and/or mobile device to interact either directly or indirectly with a reader device communicating as or within the point-of-sale system.

As used herein, the term "portable financial device" may refer to a payment device, an electronic payment device, a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet application, a personal digital assistant, a pager, a security card, a computer, an access card, a wireless terminal, and/or a transponder, as examples. The portable financial device may include a volatile or a non-volatile memory to store information, such as an account identifier or a name of the account holder. As used herein, the information or data associated with the "portable financial device" may be used to conduct electronic or online transactions with one or more merchants, such as through on online location of the merchant.

As used herein, the term "authentication system" may refer to an entity that collects and/or analyzes data to determine whether the individual initiating the transaction using data associated with a portable financial device (e.g., cardholder name, PAN number, expiration date, cvv code, billing address, and the like) is the same individual to whom the portable financial device was issued by the issuer. The determination that the individual initiating the transaction using a portable financial device is the same individual to whom the portable financial device was issued by the issuer is referred to herein as "authentication" or the "authentication process" and the various forms, methods, and processes associated therewith. The term "authentication system" may also refer to one or more computer systems operated by or on behalf of the authentication system and may include one or more computers, processors, storage devices, network interfaces, and executable instructions or code in the form of applications, APIs, software, firmware, code modules and the like operating in a network environment used for any aspect of the authentication process.

As used herein, the term "authorization system" may refer to an entity that determines whether a transaction initiated using a portable financial device should be approved (processed to completion/settlement) or declined. The authorization system may be part of or in direct or indirect communication with the issuer system. The determination that the transaction initiated using a portable financial device should be approved or declined is referred to herein as "authorization" or the "authorization process" and the various forms, methods, and processes associated therewith. The term "authorization system" may also refer to one or more computer systems operated by or on behalf of the authorization system and may include one or more computers, processors, storage devices, network interfaces, and executable instructions or code in the form of applications, APIs, software, firmware, code modules and the like operating in a network environment used for authorization.

As used herein, the term "card present transaction" may refer to a payment transaction initiated with a portable financial device in which the cardholder physically presents the portable financial device for a merchant's visual examination at the time the payment transaction is initiated with the portable financial device. A non-limiting example of a card present transaction is a payment transaction initiated by a customer at a brick-and-mortar retail store having physical POS systems, during which the cardholder physically presents the portable financial device to the merchant.

As used herein, the term "card not present transaction" or "CNP transaction" may refer to a payment transaction initiated with a portable financial device in which the cardholder does not or cannot physically present the portable financial device for a merchant's visual examination at the time the payment transaction is initiated with the portable financial device. Non-limiting examples of CNP transactions include mail-order transactions initiated by mail or facsimile, or a payment transaction initiated over the telephone or the Internet (e.g., an e-commerce transaction).

As used herein, the term "computing device" or "user device" may refer to one or more electronic devices that are configured to directly or indirectly communicate with or over one or more networks. The computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. In other non-limiting embodiments, the computing device may be a desktop computer or other non-mobile computer. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, etc.).

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, e.g., POS devices, directly or indirectly communicating in the network environment may constitute a "system," such as a merchant system.

Non-limiting embodiments or aspects of the present disclosure are directed to a method and system for the improved processing of card not present (CNP) transactions. Non-limiting embodiments or aspects of the method and system according to the present disclosure improve authorization rates for CNP transactions. Non-limiting embodiments or aspects of the method and system according to the present disclosure also reduce "false" declines of initiated transactions during an authorization process of a CNP transaction. Other non-limiting embodiments or aspects of the method and system of the present disclosure incorporate available authentication information into the authorization process for CNP transactions, facilitating improved and more accurate decision-making processes (e.g., allows the authorization system to make a more well-informed decision) as compared to existing methods in which specific authentication information is not considered. Non-limiting embodiments or aspects of the method and system according to the present disclosure help to reduce fraud instances typically associated with CNP transactions. Non-limiting embodiments or aspects of the method and system according to the present disclosure increase authorization rates and lower fraud rates of CNP transactions near or to the level achieved in traditionally more secure card present transactions.

Referring to FIG. 1, a schematic view of an existing system 10 for processing card not present transactions is shown. In this system, a user initiates a CNP transaction using a user device 12. The user device 12 communicates with a merchant system 14 operated by or on behalf of a merchant to initiate the CNP transaction for goods and/or services of the merchant. The merchant system 14 communicates with a transaction processing server 16 operated by or on behalf of a transaction service provider. The transaction service provider may be the transaction service provider associated with the portable financial device of the user used to initiate the CNP transaction. The merchant system 14 may communicate authorization transaction data associated with the CNP transaction to the transaction processing server 16. The authorization transaction data may be data required to effect authorization of the transaction between the user and the merchant relevant to processing the CNP transaction.

The authorization transaction data may include, for example, the name of user initiating the transaction, user billing address, user email address, user phone number (e.g., home phone, mobile phone, work phone), user shipping address, data indicating whether user is a new or existing user of the merchant (e.g., has made a previous purchase with the merchant), data indicating length of time user held an account with the merchant, data indicating date user created an account with the merchant, data indicating length of time since data associated with the account (e.g., shipping address, new payment account, new user, and the like) with the merchant was last changed, data indicating date information associated with the account with the merchant was last changed, data indicating length of time since user last changed or reset the password of the account with the merchant, data indicating date user last changed or reset the password of the account with the merchant, data indicating date the shipping address was used for the transaction was first used by the user, number of transactions initiated by the user in the last 24 hours with the merchant account, number of transactions initiated by the user in the six months with the merchant account, number of transactions initiated by the user in the last year with the merchant account, number of add card attempts to the merchant account in the last 24 hours, data related to fraud activity indicators associated with the user's account with the merchant or suspicious activity experienced by other accounts associated with the merchant, data indicating that the user's name is identical to the name indicated on shipping information, data indicating the length of time a payment account was associated with a merchant account, data indicating the date the payment account was first associated with the merchant account, amount of individual transaction, date of transaction, goods and services purchased, merchant identifier, merchant category code, number of transactions initiated during a time period, sum of transaction spend over a time period, and/or any other data relevant to completing the transaction and/or processing loyalty rewards associated with the transaction. The authorization transaction data may include any of the data fields specified in an authorization transaction request message compliant with ISO 8583, for example.

The merchant system 14 in existing systems 10 does not communicate authentication transaction data, such as device identification data as defined hereinafter with respect to the present disclosure, to the transaction processing server 16.

With continued reference to FIG. 1, the transaction processing server 16 communicates an authorization transaction request associated with the CNP transaction to an authorization processor 20 operated by or on behalf of the issuer of the portable financial device to request authorization of the CNP transaction. An authorization transaction request is a request from a merchant to a transaction service provider and/or an issuer of a portable financial device used to initiate a payment transaction to authorize the payment transaction. The authorization transaction request may include at least some of the authorization transaction data received by the transaction processing server 16 from the merchant system 14. The authorization transaction request may be in the format of ISO 8583 or any other suitable format for communicating a transaction request to the authorization processor 20.

The authorization processor 20 may receive the authorization transaction request from the transaction processing server 16 and may process the authorization transaction request in order to make an authorization decision in connection with the CNP transaction between the user and the merchant. The authorization decision in the existing system 10 is based on the authorization transaction data contained in the authorization transaction request and is not based on authentication transaction data as defined hereinafter with respect to the present disclosure.

With continued reference to FIG. 1, in response to determining the authorization decision, the authorization processor 20 communicates an authorization transaction response to the transaction processing server 16 containing the authorization decision. The transaction processing server 16 communicates the authorization decision from the authorization transaction response to the merchant system 14, which communicates the authorization decision to the user device 12.

The authorization decision determines whether the transaction is potentially fraudulent, such that the transaction decision would be to decline the transaction if the transaction appears to be fraudulent. In the existing system 10, the authorization processor 20 relies on the authorization transaction data included in the authorization transaction request. However, for CNP transactions, the authorization transaction data included in the authorization transaction request is less complete compared to the authorization transaction data included in a corresponding authorization transaction request in a card present transaction. This dearth of data for CNP transactions traditionally results in lower authorization rates and higher fraud rates.

For example, for authorization transaction requests that follow the ISO 8583 format and include the standard 8583 data elements in the authorization request message, at least eight 8583 data elements are materially deficient compared to card present transactions. These deficient 8583 data elements include: Date expiration (data field 14), POS data code (data field 22), Card sequence number (data field 23), Point of service capability (data field 27), Track 2 data (data field 35), Service Code (data field 40), Card acceptor terminal identification (data field 41), and Track 1 data (data field 45). One of ordinary skill will understand the information provided in each data field in the ISO 8583 format.

The present disclosure, as described herein, augments the authorization transaction data contained in existing authorization transaction requests with authentication transaction data, which enhances the data available for CNP transactions, such that authorization rates are raised and fraud rates are lowered near or to the level achieved in traditionally more secure card present transactions.

Figure 2:
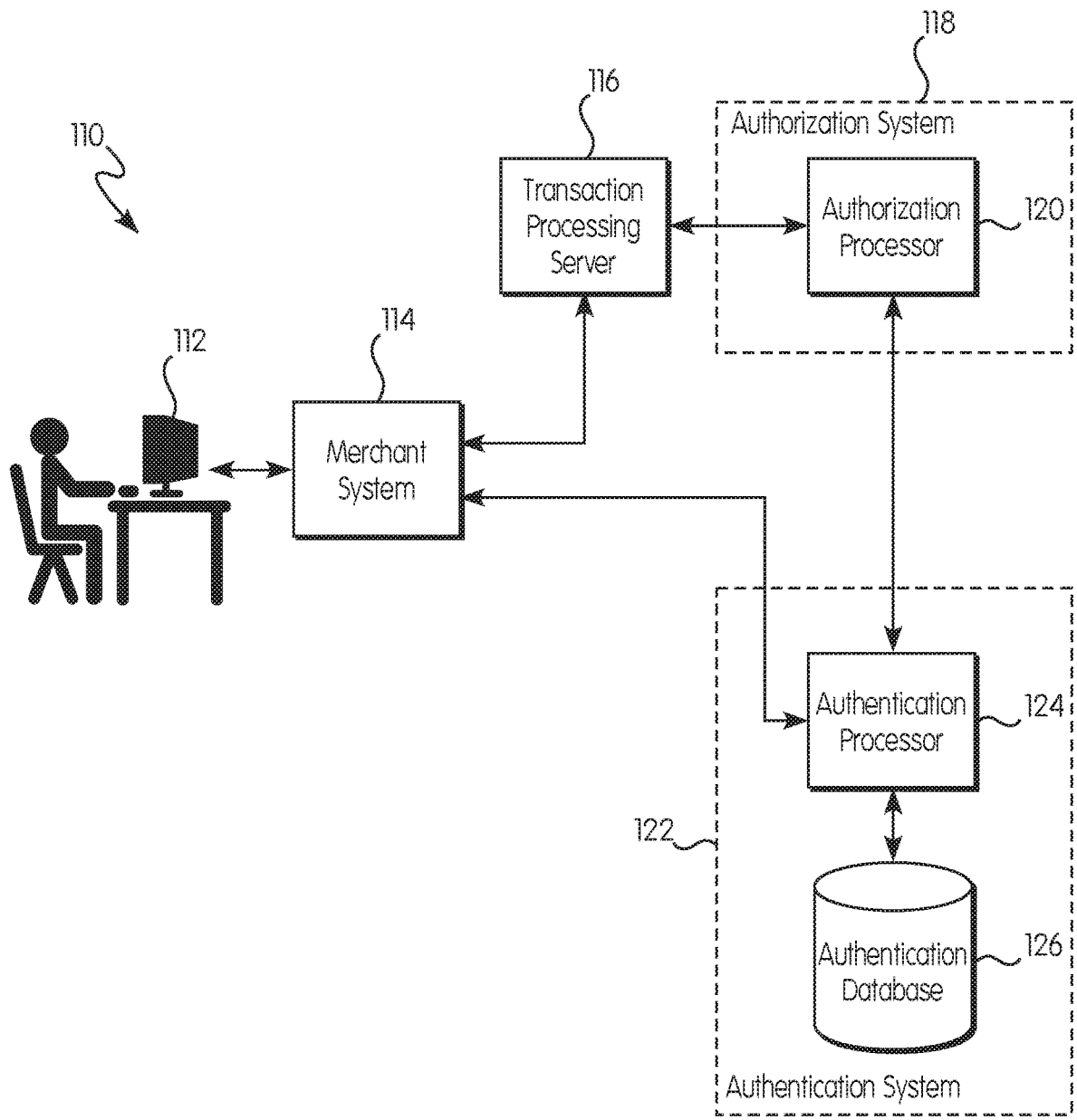
FIG. 2 is a schematic view of some non-limiting embodiments or aspects of a system for processing card not present transactions according to the principles of the present disclosure.

Referring to FIG. 2, some non-limiting embodiments or aspects of a system 110 for processing CNP transactions is shown according to the principles of the present disclosure. A user device 112 is used by a user to initiate a CNP payment transaction with a merchant. The user device 112 may be any suitable computing device capable of initiating a CNP transaction using a portable financial device of the user. The user device 112 may use relevant data of the user's portable financial device (e.g., a PAN or other authorization transaction data of the portable financial device for initiating transactions) stored on the user device 112 to initiate the CNP transaction, or the user may enter the relevant authorization transaction data into the user device 112 to initiate the CNP transaction. For example, the user device 112 may be a desktop computer, a laptop computer, or a smartphone. The user device 112 may also communicate authentication transaction data. The user device 112 may communicate the authorization transaction data and/or the authentication transaction data to a merchant system 114 operated by or on behalf of a merchant (e.g., over the Internet or other secure private or public connection), so as to initiate the CNP transaction between the user and the merchant for goods and/or services offered by the merchant.

With continued reference to FIG. 2, the merchant system 114 may be in communication with a transaction processing server 116 operated by or on behalf of a transaction service provider. The transaction service provider may be the transaction service provider associated with the portable financial device of the user used to initiate the CNP transaction. The merchant system 114 may communicate the authorization transaction data (as previously defined) associated with the CNP transaction to the transaction processing server 116.

With continued reference to FIG. 2, the transaction processing server 116 may communicate with an authorization system 118 operated by or on behalf of an issuer. The issuer may be the issuer of the portable financial device of the user used to initiate the CNP transaction, and the transaction processing server 116 may communicate with an authorization processor 120 of the authorization system 118. It will be appreciated that the authorization processor 120 may be a single processor operated by or on behalf of the issuer, or the authorization processor 120 may consist of a plurality of separate processors.

The transaction processing server 116 may communicate an authorization transaction request associated with the CNP transaction to the authorization processor 120 to request authorization of the CNP transaction. The authorization transaction request may include at least some of the authorization transaction data (previously defined) received by the transaction processing server 116 from the merchant system 114. The transaction request may be in the format of ISO 8583 or any other suitable format for communicating an authorization transaction request to the authorization processor 120. The authorization processor 120 may receive the authorization transaction request from the transaction processing server 116 and process the authorization transaction request in order to make an authorization decision in connection with the CNP transaction between the user and the merchant. The authorization decision may be based at least partially on the authorization transaction data contained in the authorization transaction request.

With continued reference to FIG. 2, the merchant system 114 may also communicate with an authentication system 122. The authentication system 122 may be operated by or on behalf of any number of entities, including the transaction service provider, the issuer, or other separate third party authentication entity. The authentication system 122 may include an authentication processor 124, which may be a single processor or server, or a plurality of processors or servers. The authentication system 122 may also include an authentication transaction database 126 in communication with the authentication processor 124 for storing authentication transaction data received from the authentication processor 124.

The merchant system 114 may communicate authentication transaction data to the authentication processor 124. In some non-limiting embodiments or aspects, the authentication processor 124 may communicate directly with the user device 112, such that the authentication processor 124 receives certain authentication transaction data directly from the user device 112.

Authentication transaction data may include device identification data and other relevant data elements received from the user device 112 useful for determining the authenticity of the user initiating the CNP transaction.

The device identification data may include any data capable of identifying the specific user device 112 itself or features associated with the user device 112. The device identification data may include browser data associated with the browser of the user device 112 initiating the CNP transaction. The device browser data may include: a browser accept header, data indicating whether the browser is Java-enabled, browser language (e.g., language in which browser displays the data to the user via the user interface), browser color depth (e.g., bit depth of the color palette for displaying images), browser screen depth (e.g., bit depth of the screen), browser screen height, browser screen width, browser time zone (e.g., time zone associated with the browser), browser user agent (e.g., the software agent acting on behalf of the user), or other data associated with the browser of the user device 112. The device identification (ID) data may include a device identifier associated with the user device 112, a device type of the user device 112 (e.g., a unique identifier assigned by the retailer and/or the manufacturer to the particular user device or other unique identifier assigned to the user device), and the like.

The authentication transaction data may include velocity data (e.g., a relevant parameter as a function of time), such as data associated with an account identifier (e.g., PAN number) of a portable financial device entered into the user device to initiate the CNP transaction, the velocity data comprising at least one of the following: number of transactions by a specified account identifier using the user device in a specified time period, amount of transactions by a specified account identifier using the user device in a specified time period, or any combination thereof. The velocity data may include data associated with an account identifier of a portable financial device entered into the user device to initiate the CNP transaction, the velocity data comprising at least one of the following: number of transactions by a specified account identifier at an IP address in a specified time period, amount of transactions by a specified account identifier at the IP address in a specified time period, or any combination thereof. The time period may be any relevant time period, such as 1 minute, 5 minutes, 10 minutes, 30 minutes, 1 hour, 2 hours, 4 hours, 6 hours, 12 hours, 24 hours, 2 days, 1 week, and the like.

The authentication transaction data may also include geolocation data associated with a location of the user device 112 initiating the CNP transaction. The authentication data may include data related to a relevant network address (e.g., an IP address), such as an IP address associated with a user device 112 at the time a transaction was initiated with the user device 112.

The authentication transaction data may be useful for determining the authenticity of the user initiating the CNP transaction. For example, the authentication transaction data may indicate the likelihood that the user device 112 used to initiate the CNP transaction is a user device of the user (e.g., likelihood that the user may have used the specific user device to initiate the CNP transaction). The authentication transaction data, such as the velocity data, may indicate that the CNP transaction activity associated with the PAN using the user device 112 or at an IP address to initiate CNP transactions is consistent with expected transaction activity, or that the velocity data indicates that the CNP transaction activity associated with the PAN using the user device 112 is consistent with potentially fraudulent transaction activity. These two non-limiting examples illustrate how the authentication transaction data, including the device identification data, may be analyzed to determine the authenticity of the user, and ultimately improve CNP transaction authorization outcomes.

As previously discussed, the authentication processor 124 may receive at least some of the above-described authentication transaction data from the merchant system 114. The authentication processor 124 may receive other of the authentication transaction data from various third party sources, such as from the transaction service provider or other third party entity that collects authentication transaction data associated with users. In this way, the authentication processor 124 may match authentication transaction data of the user from various sources to the authentication transaction data received from the merchant system 114. The authentication processor 124 itself may generate further authentication transaction data.

With continued reference to FIG. 2, upon receipt of authentication transaction data, the authentication processor 124 may store at least a portion of the authentication transaction data in an authentication transaction database 126 associated with the authentication processor 124. The authentication transaction data stored in the authentication transaction database 126 may be communicated to the authentication processor 124 during the authentication processing of subsequent transactions from the same user (e.g., based on an identical PAN number). For example, in the authentication processing of a subsequent transaction by a user, the authentication processor 124 may use stored authentication transaction data associated with that user that was previously stored in the authentication transaction database 126 to generate authentication transaction data, such as the previously-described velocity data.

In some non-limiting embodiments or aspects, the authentication processor 124 may generate authentication transaction data based on the authentication transaction data received from the merchant system 114 and/or other remote sources. For example, the authentication processor 124 may determine a transaction risk score associated with the CNP transaction between the user and the merchant based on the received authentication transaction data, and this transaction risk score may also be considered as part of the authentication transaction data. The transaction risk score may indicate the likelihood that the transaction was initiated by the individual to whom the portable financial device used to initiate the CNP transaction was issued by the issuer (e.g., indicate the authenticity of the individual initiating the transaction). The transaction risk score may consider any number of types of authentication transaction data, and may weigh the considered authentication transaction data using any suitable algorithm. The transaction risk score may be represented in any form, such as a numerical score (e.g., as a score between 1 and 100), as a grade (e.g., A to F), as a status (e.g., low risk, medium risk, and high risk), or any other way of quantitatively or qualitatively defining risk associated with the CNP transaction.

The transaction risk score may be determined using a neural network based method, a rules-based method, or some combination thereof. The transaction risk score may be based on any of the previously defined authorization transaction data and/or authentication transaction data.

In some embodiments, the authentication processor 124 may receive a transaction risk score as authentication transaction data, such that the transaction risk score is not generated by the authentication processor 124 but is an externally generated transaction risk score. This externally generated transaction risk score may be received from the transaction service provider or other third party authentication entity.

With continued reference to FIG. 2, the authentication system 122 may communicate with the authorization system 118 to communicate an authentication transaction request including at least a portion of the authentication transaction data to the authorization system 118. For example, the authentication processor 124 may communicate at least a portion of the authentication transaction data to the authorization processor 120, and the authorization processor 120 may match the authentication transaction data from the authentication processor 124 to the authorization transaction data received from the transaction processing server 116 via the authorization transaction request, which is associated with the same CNP transaction between the user and the merchant.

The authorization processor 120, may generate further authentication transaction data based on the authentication transaction data received from the authentication processor 124. In some non-limiting embodiments or aspects, the authorization processor 120 may determine a transaction risk score in the manner described above with respect to the authentication processor 124. The authorization processor 120 may use additional data, such as authorization transaction data, to determine the transaction risk score, or the transaction risk score may be based solely on the authentication transaction data received from the authentication processor 124.

With continued reference to FIG. 2, based upon the authentication transaction data and the authorization transaction data associated with the CNP transaction between the user and the merchant, the authorization processor 120 may determine an authorization decision for the CNP transaction. The authorization decision may be to approve the transaction and initiate further processing of the CNP transaction (e.g., settlement and clearing of the transaction). Alternatively, the authorization decision may be to decline the transaction and prohibit further processing of the CNP transaction.

In some non-limiting embodiments or aspects, an authorization decision to decline the transaction may be based on the determination by the authorization processor 120 that the transaction is a potentially fraudulent transaction. In such scenarios, the authorization system 118 may communicate with the transaction processing server 116 and/or a known device of the individual to whom the portable financial device was issued (which may be separate from the user device 112 used to initiate the transaction) with a notification that a potentially fraudulent CNP transaction was initiated. In this way, the authorization system 118 may automatically initiate fraud alerts and/or fraud preventative measures on behalf the user and/or the transaction service provider and/or the issuer based on the authorization transaction data and/or the authentication transaction data.

In some non-limiting embodiments or aspects, an authorization system 118 may automatically enter into a confirmation protocol prior to determining whether to approve or decline the transaction. For example, the authorization system 118 may determine that the CNP transaction is a potentially fraudulent transaction. Rather than automatically declining the CNP transaction, the authorization system 118 may communicate with the transaction processing server 116 and/or a known device of the individual to whom the portable financial device was issued (which may be separate from the user device 112 used to initiate the transaction) to confirm whether the transaction was initiated by the individual to whom the portable financial device was issued. This confirmation may be in the form of a return message from the transaction processing server 116 of the known device of the individual to whom the portable financial device was issued. In other examples, the authorization system 118 may communicate with the user device 112 for further information to determine whether the user of the portable financial device is the individual to whom the portable financial device was issued. The further information may be in the form of a password, a predetermined security question, other information likely known by the individual to whom the portable financial device was issued and not an identity thief, or other method of confirming the identity of the user initiating the CNP transaction using the user device 112.

The authorization decision may be determined by the authorization processor 120 using any suitable method. In some non-limiting embodiments or aspects of the disclosure, the authorization decision may be determined using a rule-based protocol. For example, the rule-based protocol may provide that a transaction determined to meet the rules criteria for approval of the transaction (e.g., have at least a minimum transaction risk score) be approved, and a transaction having a transaction risk score that does not meet the rules criteria for approval of the transaction (e.g., not have a minimum transaction risk score) be declined. In another example, the authorization decision may be based on an algorithm that weighs certain authentication transaction data and/or authorization transaction data deemed to be relevant in a predetermined way. In another example, the authorization decision may also conditionally consider certain authorization transaction data and/or authentication transaction data, such that a specific value associated with the certain authorization transaction data and/or authentication transaction data (alone or in combination with other data) indicates that the transaction is to be approved or declined.

In response to determining the authorization decision, the authorization processor 120 may communicate a transaction response to the transaction processing server 116 containing the authorization decision. The transaction processing server 116 may communicate the authorization decision from the transaction response to the merchant system 114, which may communicate the authorization decision to the user device 112.

Figure 3:
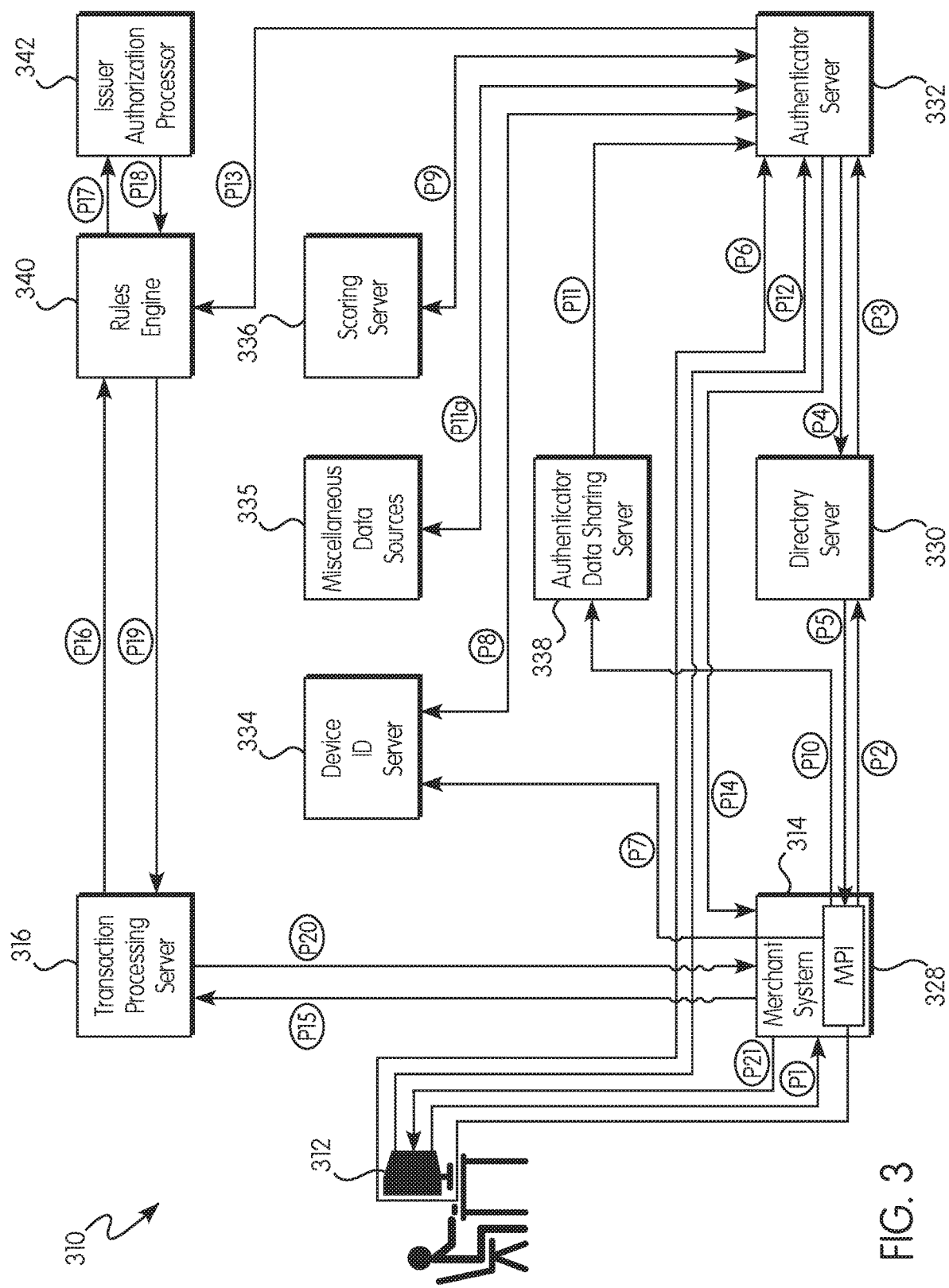
FIG. 3 is a schematic view and a process flow diagram of some non-limiting embodiments or aspects of a system and method for processing card not present transactions according to the principles of the present disclosure.

FIG. 3 provides a schematic view and a process flow diagram of some non-limiting embodiments or aspects of a system/method 310 for processing CNP transactions is shown. The system 310 includes a user device 312 that includes all of the features of the user device 112 of FIG. 2, and a merchant system 314 that includes all of the features of the merchant system 114 of FIG. 2. At a first step (P1), the user device 312 may be used by a user to initiate a CNP transaction by communicating at least some of the previously-described data elements to the merchant system 314 operated by or on behalf of the merchant. The portable financial device used to initiate the CNP transaction is enrolled or registered in an Authentication Program. The Authentication Program may use the authentication transaction data for determining the authorization decision associated with the CNP transaction.

The merchant system 314 may further include a merchant plug-in (MPI) 328. The MPI 328 may be an additional software component added to the merchant system 314 capable of conducting functions associated with processing the authentication transaction data associated with the user and/or the CNP transaction. At a second step (P2), the MPI 328 may communicate a verification request to a directory server 330 to determine whether the issuer that issued the portable financial device used to initiate the CNP transaction participates in the Authentication Program. The directory server 330 may determine whether the issuer participates in the Authentication Program based on the Bank Identification Number (BIN), which is transaction data received by the merchant system 314 or any other data capable of identifying the issuer of the portable financial device. The directory server 330 may be operated by or on behalf of any suitable entity, such as the merchant, the transaction service provider, the issuer, a third party authentication entity, or other third party source.

At a third step (P3), upon determining that the issuer does participate in the Authentication Program, the directory server 330 may forward the verification request to an authenticator server 332. The authenticator server 332 may be operated by or on behalf of the issuer, the transaction service provider, or a third party authentication entity. The authenticator server 332 may be one of the processors of the previously-described authentication processor 124 of FIG. 2. The authenticator server 332 may determine whether the portable financial device used to initiate the CNP transaction is enrolled in the Authentication Program, and may base this determination on the PAN number associated with the portable financial device, or any other data capable of identifying the portable financial device used to initiate the CNP transaction. At a fourth step (P4), the authenticator server 332 may communicate a first verification response to the directory server 330, and the first verification response may include whether the portable financial device participates in the Authentication Program. At a fifth step (P5), the directory server 330 may communicate a second verification response to the MPI 328. The second verification response may include the first verification response and may further include whether the issuer participates in the Authentication Program. Therefore, from the second verification response, the MPI 328 may determine that both the issuer and the user (based on the portable financial device being used) are participants in the Authentication Program.

Upon determining that both the issuer and the user are participating in the Authentication program, at a sixth step (P6), the MPI 328 may transfer control of the user's browser session from the merchant system 314 (e.g., a website operated by or on behalf of the merchant) to the authenticator server 332. The MPI 328 may also communicate a payer authentication request message to the authenticator server 332 to request authorization of the CNP transaction. The payer authentication request message may include the PAN of the portable financial device, and relevant authentication transaction data. The MPI 328 requests the various data elements (e.g., authorization transaction data and/or authentication transaction data) from the merchant system 314 or directly from the user device 312.

At a seventh step (P7), the MPI 328 (or the user device 312 or merchant system 314) may communicate certain authentication transaction data to a device identification (ID) server 334. The authentication transaction data may include the previously discussed device identification data. The device ID server 334 may be operated by or on behalf of the issuer, the transaction service provider, the third party authentication entity, or other third party source. The device ID server 334 may be one of the processors of the previously-described authentication processor 124 of FIG. 2. At an eighth step (P8), the device ID server 334 may communicate the device identification data to the authenticator server 332. The device ID server 334 may include further device identification data associated with the user device 312 that was not received from the MPI 328 but was obtained through other channels not associated with the CNP transaction. This further device identification data may also be communicated to the authenticator server 332. In some non-limiting embodiments or aspects, the authenticator server 332 may instead receive the device identification data directly from the MPI 328, the merchant system 314, or the user device 312, as opposed to including a separate device ID server 334. The authenticator server 332 may store the received device identification data.

At a ninth step (P9), the authenticator server 332 may communicate with a scoring server 336, and the scoring server 336 may determine the previously described transaction risk score (also authentication transaction data) associated with the user device 312. The scoring server may be operated by or on behalf of the issuer, the transaction service provider, the third party authentication entity, or other third party source. The scoring server 336 may be one of the processors of the previously-described authentication processor 124 of FIG. 2. The transaction risk score may be based on the authorization transaction data, the authentication transaction data, and/or other data available to the scoring server 336. Once determined, the scoring server 336 may communicate the transaction risk score to the authenticator server 332. In some non-limiting examples, the authenticator server 332 determines the transaction risk score without communication with the scoring server 336.

At a tenth step (P10), the MPI 328 may communicate with an authenticator data sharing server 338. The MPI 328 may send any authentication transaction data received from the merchant system 314 not yet communicated to the authenticator server 332 to the authenticator data sharing server 338. At an eleventh step (P11), the authenticator data sharing server 338 may communicate the additional authentication transaction data to the authenticator server 332. In some non-limiting embodiments or aspects, the authenticator server 332 may receive the additional authentication transaction data from the MPI 328, the merchant system 314, or the user device 312 directly.

Also at an eleventh (a) step (P11*a*), the authenticator server 332 may receive any additional miscellaneous authentication transaction data that may be relevant to the Authentication Program from at least one miscellaneous data source 335. The miscellaneous data source 335 may be the transaction service provider, the issuer, the merchant, or other third party entity storing the relevant miscellaneous authentication transaction data associated with the user device 312. At a twelfth step (P12), the authenticator server 332 may receive device identification data including user device browser data associated with the user device 312 from the user device 312. The authenticator server 332 may store this user device browser data.

At a thirteenth step (P13), the authenticator server 332 may communicate at least some of the received authentication transaction data described in previous steps to a rules engine 340 in the form of an authentication transaction request. The rules engine 340 may include a processor operated by or on behalf of the issuer. The rules engine 340 may be one of the processors of the authorization processor 120 of FIG. 2. The rules engine 340 may store this data for an authorization risk assessment. The rules engine 340 may acknowledge receipt of the authentication transaction request.

At a fourteenth step (P14), the authenticator server 332 may communicate a payer authentication response to the payer authentication request to the MPI 328. The payer authentication response may include an electronic commerce indicator (ECI) value indicating whether the user and/or the issuer participate in the Authentication Program. The payer authentication response may include a cardholder authentication verification value (CAVV), which confirms the validity of the authentication associated with the CNP transaction. The CAVV may indicate that the authentication results were not validated, that validation failed, or that validation passed. The MPI 328 may communicate the ECI value and the CAVV to the merchant system 314. At a fifteenth step (P15), the merchant system 314 may communicate the authorization transaction data to the transaction processing server 316 to initiate authorization of the CNP transaction. The authorization transaction data may include any of the previously-described authorization transaction data, and may also include the ECI value and the CAVV.

At a sixteenth step (P16), the transaction processing server 316 may communicate the previously-described authorization transaction request associated with the CNP transaction to the rules engine 340 to request authorization of the CNP transaction. The authorization transaction request may include at least some of the authorization transaction data received by the transaction processing server 116 from the merchant system 114. The authorization transaction request may be in the format of ISO 8583, or any other suitable format.

At a seventeenth step (P17), the rules engine 340 may match the authorization transaction data received from the transaction processing server 316 with the authentication transaction data received from the authenticator server 332 for the CNP transaction. The rules engine 340 may send an authorization request to an issuer authorization processor 342 operated by or on behalf of the issuer. The authorization request may include the authorization transaction data received by the rules engine 340 from the transaction processing server 316 matched with the authentication transaction data received by the rules engine 340 from the authenticator server 332. The issuer authorization processor 342 may determine the authorization decision (e.g., approve or decline the CNP transaction) based on the data included in the authorization request from the rules engine 340. At an eighteenth step (P18), the issuer authorization processor 342 may communicate an authorization response to the rules engine 340 including the authorization decision.

At a nineteenth step (P19), the rules engine 340 may communicate the authorization transaction response to the transaction processing server 316. The authorization transaction response may include the authorization decision. At a twentieth step (P20), the transaction processing server 316 may communicate the authorization decision to the merchant system 314, and at a twenty-first step (P21), the merchant system 314 may communicate the authorization decision to the user device 312.

Figure 4:
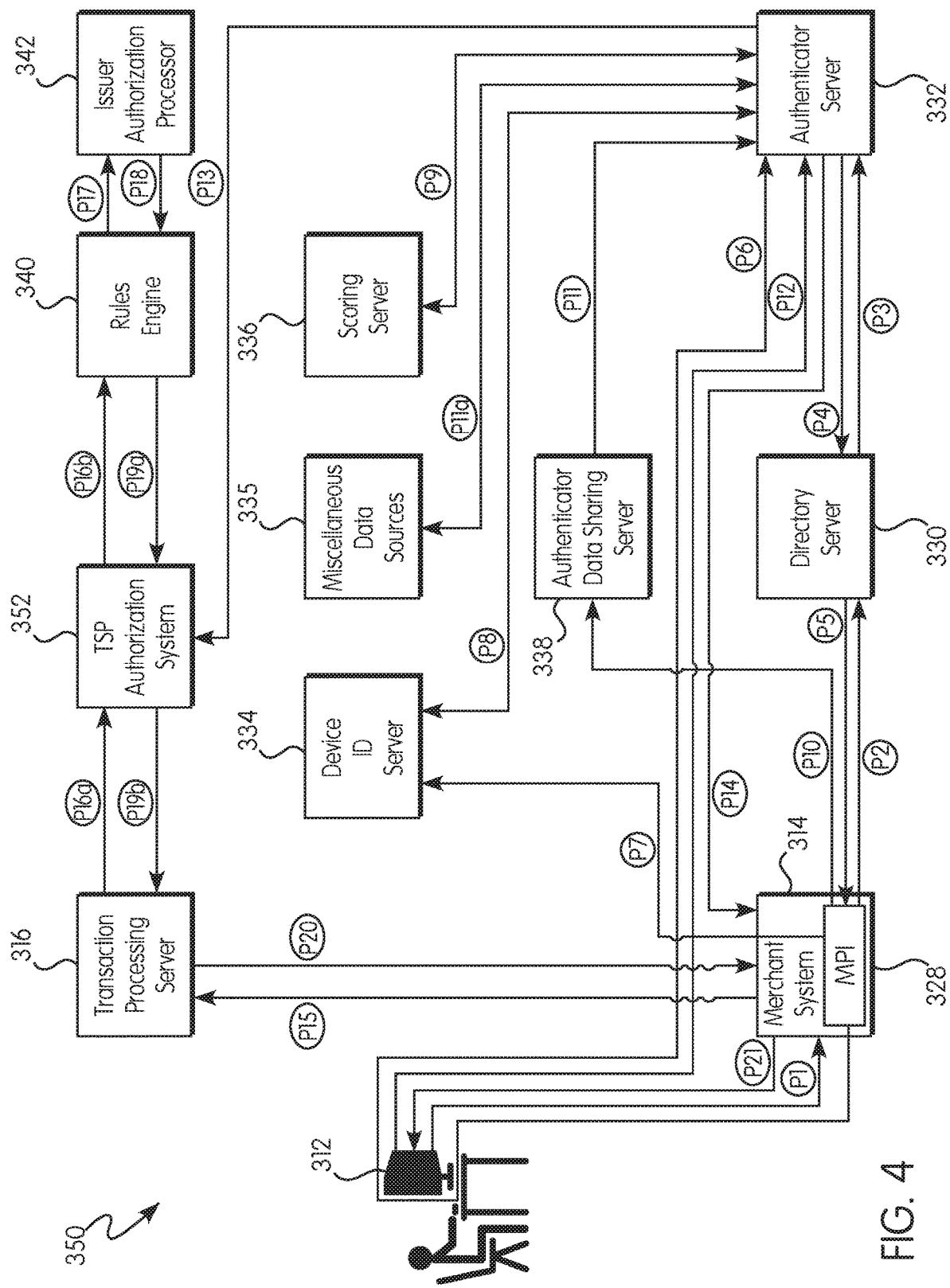
FIG. 4 is a schematic view and a process flow diagram of some non-limiting embodiments or aspects of a system and method for processing card not present transactions according to the principles of the present disclosure.

Referring to FIG. 4, another schematic view and a process flow diagram of some non-limiting embodiments or aspects of a system/method 350 for processing CNP transactions is shown. The system/method 350 is identical to the system/method 310 from FIG. 3 with the following exceptions.

According to FIG. 4, a TSP authorization system 352 is further provided, which may be at least one processor operated by or on behalf of the transaction service provider. At step P13, the authenticator server 332 communicates the authentication transaction data to the TSP authorization system 352. Step P16a is identical to Step P16 from FIG. 3 except the transaction processing server 316 communicates the authorization transaction data to the TSP authorization system 352. At step P16b, the TSP authorization system 352 communicates the authentication transaction data and the authorization transaction data to the rules engine 340. Step P19a is identical to Step P19 from FIG. 3 except the rules engine 340 communicates the authorization transaction response to the TSP authorization system 352. At step P19b, the TSP authorization system 352 communicates the authorization transaction response to the transaction processing server 316.

Figure 5:
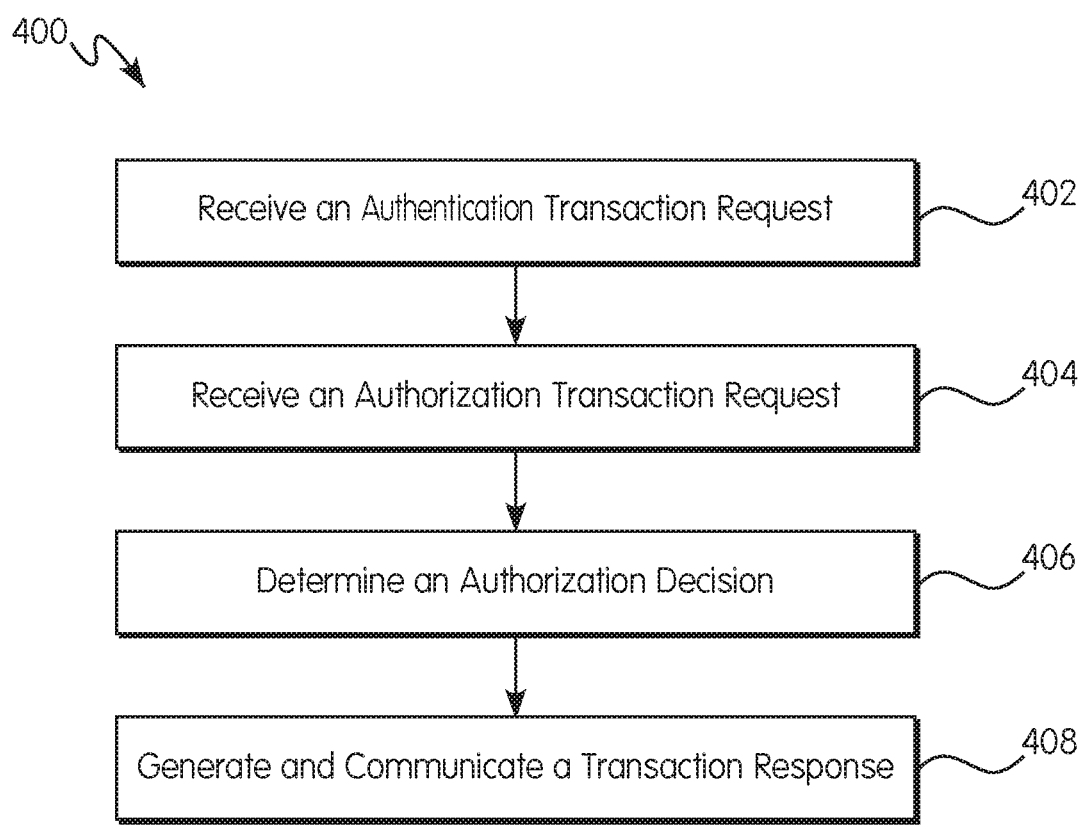
FIG. 5 is a step diagram of a further non-limiting embodiment or aspect of a method for processing card not present transactions according to the principles of the present disclosure.

Referring to FIG. 5, a method 400 for processing CNP transactions is shown. At step 402, the authorization processor 120 may receive the authentication transaction request including the authentication transaction data associated with the CNP transaction from the authentication system 122. At step 404, the authorization processor 120 may receive the authorization transaction request including the authorization transaction data from the transaction processing server 116 as previously described. At step 406, the authorization processor 120 may determine the authorization decision as previously described, and at step 408, the authorization processor 120 may generate and communicate that transaction response including the authorization decision as previously described.

The following example is provided to illustrate an embodiment, aspect, or implementation of the system and method for processing CNP transactions, and is not meant to be limiting.

Figure 6:
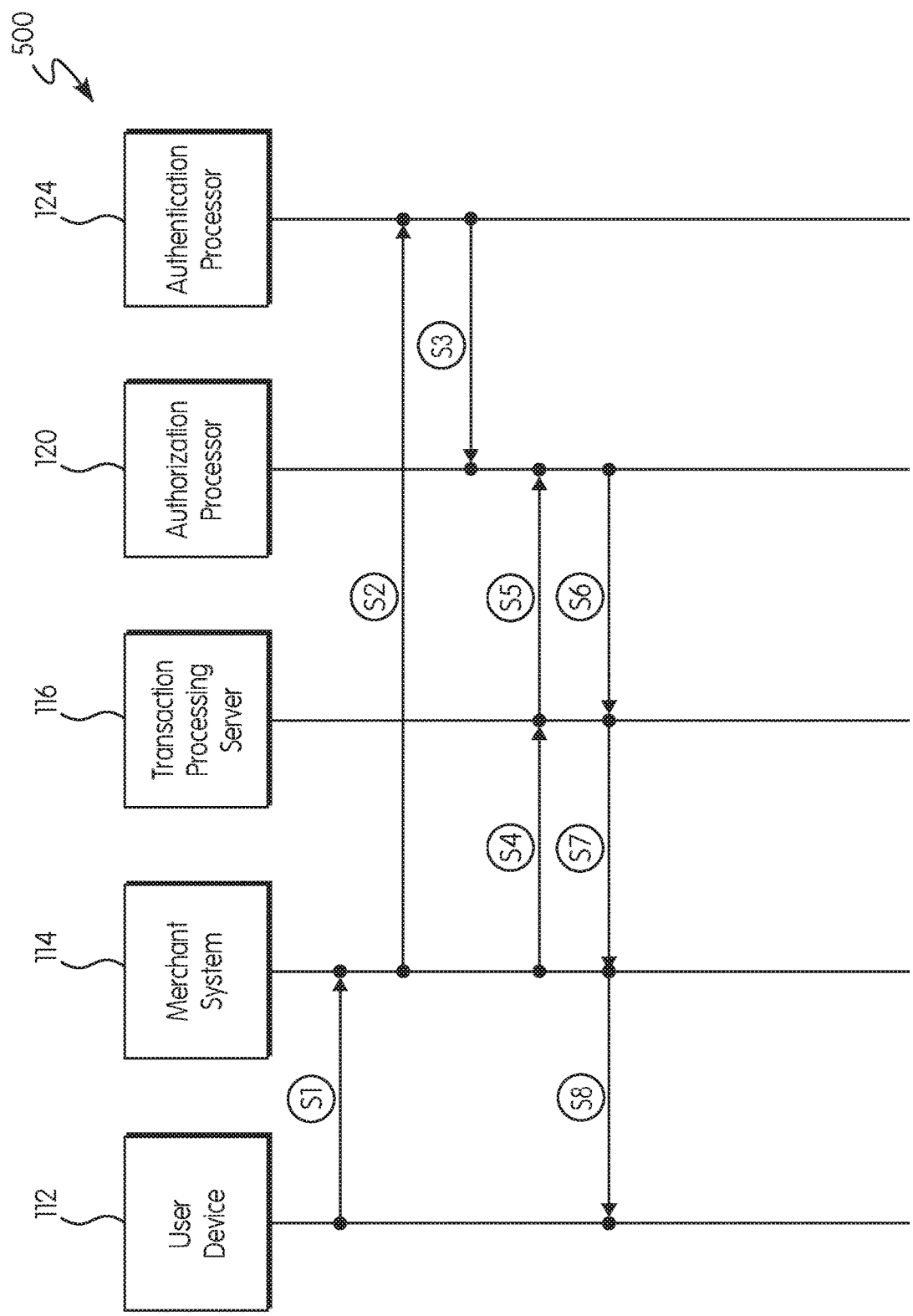
FIG. 6 is a process flow diagram of some non-limiting embodiments or aspects of a method for processing card not present transactions according to the principles of the present disclosure.

Referring to FIG. 6, a non-limiting example of a method 500 for processing CNP transactions is shown. In this example, John Smith is a user shopping over the Internet for several household items using his home computer (e.g., the user device 112). After finding the items he wants, he purchases those items at online retailer with a website: www.nile.com (hereinafter "Nile"). At a first step (51), the transaction for these household items is initiated as a CNP transaction by John's user device 112, which is communicating with Nile's merchant system 114. John's user device 112 communicates a primary account number (PAN) associated with one of John's credit cards (e.g., a portable financial device) and other relevant data (authorization transaction data and authentication transaction data) to initiate the CNP transaction with Nile's merchant system.

At a second step (S2), Nile's merchant system 114 communicates the authentication transaction data, including device identification data associated with John's user device 112 that he used to initiate the CNP transaction, to the authentication processor 124. In this non-limiting example, the authentication processor 124 is operated by or on behalf of a third-party authentication company: Authenticator, Inc. (hereinafter "Authenticator"). However, it will be appreciated that the authentication processor 124 may be operated by or on behalf of other entities, such as First Service Provider (the transaction service provider of John's credit card) or First Issuer Bank (the issuer bank of John's credit card). The authentication processor 124 of Authenticator may determine further authentication transaction data, such as velocity data or a transaction risk score, based on the authentication transaction data received from Nile's merchant system 114.

At a third step (S3), Authenticator's authentication processor 124 communicates the authentication transaction data to First Issuer Bank's authorization processor 120. The authorization processor 120 may also determine further authentication transaction data based on the data received from Authenticator's authentication processor 124 and/or from authorization transaction data received in the authorization transaction request from First Service Provider's transaction processing server 116 (described in a later step).

At a fourth step (S4), Nile's merchant system 114 communicates at least a portion of the authorization transaction data associated with the CNP transaction to the transaction processing server 116 of First Service Provider. At a fifth step (S5), First Service Provider's transaction processing server 116 communicates an authorization transaction request including at least a portion of the authorization transaction data associated with the CNP transaction to the authorization processor 120 of First Issuer Bank. The authorization processor 120 associates the received authorization transaction data with the authentication transaction data (for the same CNP transaction).

At a sixth step (S6), First Issuer Bank's authorization processor 120 may, in response to receiving the authentication transaction data and the transaction data, determine an authorization decision for the CNP transaction between John and Nile. The authorization decision is based at least partially on the authentication transaction data and the authorization transaction data using any sufficient method and/or algorithm. Based at least on the authentication transaction data, the authorization processor 120 authenticates that John was the individual initiating the CNP transaction and determines that the authorization decision is to approve the CNP transaction for further processing. However, had the CNP transaction been fraudulently initiated, such as by an identity thief, the authorization processor 120 may have determined, based at least on the authentication transaction data, that the CNP transaction was fraudulently initiated, and an authorization decision to decline the transaction may have been determined instead. In addition, and if the authorization decision to decline was based on fraud (for example, as opposed to an account limit), the system may generate the appropriate alerts or messages and transmit them to specified servers and/or devices. In response to the transaction request from First Service Provider's transaction processing server 116, First Issuer Bank's authorization processor 120 generates and communicates the transaction response including the authorization decision to approve the CNP transaction.

At a seventh step (S7), First Service Provider's transaction processing server 116 communicates the authorization decision to Nile's merchant system 114. At an eighth step (S8), Nile's merchant system 114 communicates the authorization decision to John's user device 112. The CNP transaction between John and Nile may then be further processed to completion (e.g., settling and clearing the transactions). In this way, the CNP transaction between John and Nile may be processed according to the present disclosure to raise authorization rates and lower fraud rates of CNP transactions near or to the level achieved had John gone to a brick-and-mortar location of Nile to initiate a card present transaction for the household items.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A method for processing card not present (CNP) transactions, comprising:

receiving, by an issuer system that issued a portable financial device of a user, a transaction request associated with a CNP transaction between the user and a merchant initiated with a computing device of the user using the portable financial device during a browser session on the computing device, wherein the CNP transaction is initiated by the computing device communicating with a merchant system of the merchant on a website of the merchant;

determining, by the issuer system, that the user participates in an authentication protocol;

receiving, by the merchant system, a notification that the user participates in the authentication protocol;

in response to receiving the notification, transferring control, by the merchant system, of the browser session from the merchant system to the issuer system;

receiving, by the issuer system and from the computing device during the browser session, a first request comprising an authentication transaction request comprising at least one data field containing authentication transaction data associated with the CNP transaction, wherein the authentication transaction data comprises device identification data identifying the computing device;

receiving, by the issuer system and from a transaction processing server, a second request comprising an authorization transaction request comprising at least one data field containing authorization transaction data associated with the portable financial device;

in response to receiving the authorization transaction data and the authentication transaction data, matching, by the issuer system, a portion of the authorization transaction data to a portion of the authentication transaction data;

determining, by the issuer system, an authorization decision for the CNP transaction based at least partially on both the authorization transaction data and the authentication transaction data; and in response to the authorization transaction request, generating and communicating, by the issuer system, an authorization transaction response comprising at least one data field containing the authorization decision.

2. The method of claim 1, wherein the authentication transaction data comprises velocity data associated with an account identifier of the portable financial device entered into the computing device to initiate the CNP transaction, the velocity data comprising at least one of the following: number of transactions by a specified account identifier using the computing device in a specified time period, amount of transactions by a specified account identifier using the computing device in a specified time period, or any combination thereof.

3. The method of claim 1, wherein the authentication transaction data comprises velocity data associated with an account identifier of the portable financial device entered into the computing device to initiate the CNP transaction, the velocity data comprising at least one of the following: number of transactions by a specified account identifier at an IP address in a specified time period, amount of transactions by a specified account identifier at the IP address in a specified time period, or any combination thereof.

4. The method of claim 1, wherein the device identification data received during the browser session comprises device browser data collected from and associated with a browser of the computing device, wherein the device browser data comprises at least one of the following: a browser accept header, data indicating whether the browser is Java-enabled, browser language, browser color depth, browser screen depth, browser screen height, browser screen width, browser time zone, browser user agent, or any combination thereof.

5. The method of claim 1, wherein the device identification data received during the browser session comprises a device identifier collected from and associated with a browser of the computing device, wherein the device identifier comprises at least one of the following: a unique device ID, a device type, or any combination thereof of the computing device.

6. The method of claim 1, wherein the authentication transaction data comprises an IP address received during the browser session collected from and associated with the computing device.

7. The method of claim 1, wherein the authentication transaction data comprises geolocation data received during the browser session collected from the computing device and associated with a location of the computing device.

8. The method of claim 1, wherein receiving the authentication transaction data comprises receiving a transaction risk score from an authentication system, wherein the method further comprises determining the authorization decision based at least partially on the transaction risk score.

9. The method of claim 1, further comprising:

in response to receiving the authentication transaction data comprising the device identification data, determining a transaction risk score; and determining the authorization decision based at least partially on the transaction risk score.

10. A system for processing card not present (CNP) transactions comprising an issuer system that issued a portable financial device of a user programmed or configured to:

receive a transaction request associated with a CNP transaction between the user and a merchant initiated with a computing device of the user using the portable financial device during a browser session on the computing device, wherein the CNP transaction is initiated by the computing device communicating with a merchant system of the merchant on a website of the merchant;

determine that the user participates in an authentication protocol;

communicate a notification to the merchant system that the user participates in the authentication protocol;

in response to communicating the notification, receive control of the browser session from the merchant system to the issuer system;

receive, from the computing device during the browser session, a first request comprising an authentication transaction request comprising at least one data field containing authentication transaction data associated with the CNP transaction, wherein the authentication transaction data comprises device identification data identifying the computing device;

receive, from a transaction processing server, a second request comprising an authorization transaction request comprising at least one data field containing authorization transaction data associated with the portable financial device;

in response to receiving the authorization transaction data and the authentication transaction data, matching, by the issuer system, a portion of the authorization transaction data to a portion of the authentication transaction data;

determine an authorization decision for the CNP transaction based at least partially on both the authorization transaction data and the authentication transaction data; and in response to the authorization transaction request, generate and communicate an authorization transaction response comprising at least one data field containing the authorization decision.

11. The system of claim 10, wherein the authentication transaction data comprises velocity data associated with an account identifier of the portable a portable financial device entered into the computing device to initiate the CNP transaction, the velocity data comprising at least one of the following: number of transactions by a specified account identifier using the computing device in a specified time period, amount of transactions by a specified account identifier using the computing device in a specified time period, or any combination thereof.

12. The system of claim 10, wherein the authentication transaction data comprises velocity data associated with an account identifier of the portable financial device entered into the computing device to initiate the CNP transaction, the velocity data comprising at least one of the following: number of transactions by a specified account identifier at an IP address in a specified time period, amount of transactions by a specified account identifier at the IP address in a specified time period, or any combination thereof.

13. The system of claim 10, wherein the device identification data received during the browser session comprises device browser data collected from and associated with a browser of the computing device, wherein the device browser data comprises at least one of the following: a browser accept header, data indicating whether the browser is Java-enabled, browser language, browser color depth, browser screen depth, browser screen height, browser screen width, browser time zone, browser user agent, or any combination thereof.

14. The system of claim 10, wherein the device identification data received during the browser session comprises a device identifier collected from and associated with a browser of the computing device, wherein the device identifier comprises at least one of the following: a unique device ID, a device type, or any combination thereof of the computing device.

15. The system of claim 10, wherein the authentication transaction data comprises an IP address received during the browser session collected from and associated with the computing device.

16. The system of claim 10, wherein the authentication transaction data comprises geolocation data received during the browser session collected from the computing device and associated with a location of the computing device.

17. The system of claim 10, wherein the authentication transaction data comprises a transaction risk score from an authentication system, wherein the authorization decision is based at least partially on the transaction risk score.

18. The system of claim 10, wherein the at least one processor is further programmed or configured to:

in response to receiving the authentication transaction data comprising the device identification data, determine a transaction risk score; and determine the authorization decision based at least partially on the transaction risk score.

19. A system for processing card not present (CNP) transactions comprising:

an issuer system that issued a portable financial device of a user, the issuer system comprising an authentication system and an authorization system;

the authentication system comprising at least one processor programmed or configured to:

receive a transaction request associated with a CNP transaction between the user and a merchant initiated with a computing device of the user using the portable financial device during a browser session on the computing device, wherein the CNP transaction is initiated by the computing device communicating with a merchant system of the merchant on a website of the merchant;

receive control of the browser session from the merchant system;

receive, from the computing device during the browser session, authentication transaction data associated with the CNP transaction, wherein the authentication transaction data comprises device identification data identifying the computing device; and communicate the authentication transaction data via an authentication transaction request to the authorization system programmed or configured to determine an authorization decision associated with the CNP transaction; and the authorization system comprising at least one processor programmed or configured to:

receive from a transaction processing server, an authorization transaction request comprising authorization transaction data associated with the portable financial device;

in response to receiving the authorization transaction data and the authentication transaction data, determine the authorization decision for the CNP transaction based at least partially on both the authorization transaction data and the authentication transaction data; and in response to the authorization transaction request, generate and communicate an authorization transaction response comprising at least one data field containing the authorization decision.

20. The system of claim 19, wherein the at least one authentication system processor is further programmed or configured to determine a transaction risk score and communicate the transaction risk score to the authorization system as part of the authentication transaction data.

* * * * *